United States Patent
Lang et al.

(10) Patent No.: US 7,180,729 B2
(45) Date of Patent: Feb. 20, 2007

(54) ARRANGEMENT FOR CONTROLLING AND MONITORING A SWITCHGEAR ASSEMBLY

(75) Inventors: Gerhard Lang, Wilhelmshorst (DE); Gerhard Stich, Cadolzburg (DE)

(73) Assignee: Siemens Aktiengesellschaft, Munich (DE)

( * ) Notice: Subject to any disclaimer, the term of this patent is extended or adjusted under 35 U.S.C. 154(b) by 26 days.

(21) Appl. No.: 10/528,421

(22) PCT Filed: Sep. 12, 2003

(86) PCT No.: PCT/DE03/03104

§ 371 (c)(1),
(2), (4) Date: Mar. 18, 2005

(87) PCT Pub. No.: WO2004/030174

PCT Pub. Date: Apr. 8, 2004

(65) Prior Publication Data

US 2006/0109611 A1    May 25, 2006

(30) Foreign Application Priority Data

Sep. 20, 2002    (DE) ............................... 102 44 845

(51) Int. Cl.
| | |
|---|---|
| H02B 1/26 | (2006.01) |
| G05D 9/00 | (2006.01) |
| G08B 21/00 | (2006.01) |
| G01R 25/00 | (2006.01) |
| G01R 27/00 | (2006.01) |
| G06F 11/00 | (2006.01) |
| H02B 5/00 | (2006.01) |
| H02B 7/00 | (2006.01) |

(52) U.S. Cl. ............. 361/625; 700/292; 340/635; 702/65; 702/188; 361/602; 361/605

(58) Field of Classification Search .............. 700/2–4, 700/9, 19–22, 79, 82, 286, 292, 295; 702/57–65, 702/188; 709/208, 218, 224, 249, 250, 253; 340/3.1, 3.9, 635; 361/601–603, 605, 611, 361/620–625, 627, 628, 631, 632
See application file for complete search history.

(56) References Cited

U.S. PATENT DOCUMENTS 6,137,776 A * 10/2000 Bauerschmidt et al. ..... 370/216

(Continued)

FOREIGN PATENT DOCUMENTS

| DE | 42 30 603 C1 | 3/1994 |
|---|---|---|
| EP | 0 175 120 A1 | 8/1985 |

OTHER PUBLICATIONS

P. Geib et al., "Offene Systemtechnik in Niderspannungs-Schaltgeräten," Elektrotechnische Zeitschrift, 115, Mar. 1994, No. 5, Berlin, Germany.

(Continued)

*Primary Examiner*—Crystal J. Barnes
(74) *Attorney, Agent, or Firm*—Morrison & Foerster LLP

(57) ABSTRACT

The invention is to create a n arrangement for controlling and monitoring a switching installation which can be produced in a relatively cost-effective manner. To this end, the arrangement comprises a station control computer system into which the functions of at least one process control appliance and at least on protective appliance are integrated. Furthermore, the arrangement also comprises devices used to digitally control switches of the switching installation and comprising digital inputs and outputs, and an electronic conversion system arranged close to the switches and provided with digital outputs. The digital inputs and outputs of the devices for digital control and the digital outputs of the electronic conversation system are directly connected to the station control computer device by means of communication connections.

5 Claims, 1 Drawing Sheet

U.S. PATENT DOCUMENTS

| | | | |
|---|---|---|---|
| 6,198,402 B1* | 3/2001 | Hasegawa et al. | 340/635 |
| 6,845,301 B2* | 1/2005 | Hamamatsu et al. | 700/292 |
| 6,882,888 B2* | 4/2005 | Wimmer et al. | 700/18 |
| 6,954,704 B2* | 10/2005 | Minami et al. | 702/62 |
| 6,970,771 B1* | 11/2005 | Preiss et al. | 700/286 |
| 2004/0098172 A1* | 5/2004 | Deck et al. | 700/295 |

OTHER PUBLICATIONS

Siemens, SICAM HV—Prozessleitgerät (Bay Processing Unit BPU), Bestell-Nr. E50001-U113-A230/6.

Siemens, "SICAM HV—Digitale Leistungsschaltersteuerung," Bestell-Nr. E50001-U113-A230/1.

Siemens, "SICAM HV—Trennersteuerung und-überwachung," Switch Control and Monitoring SCM), Bestell-Nr. E5001-U113-A230/2.

SICAM HV—Faseroptischer Stromesensor (SIFOCS), Bestell Nr. E5001-U113-A230/3.

SICAM HV—Wandlerelektronik (Instrument Transformer Unit ITU), Bestell-Nr. E50001-U113-A230/4.

SICAM HV—Kommunikationsmodul (Process Communication Unit PCU), Bestell-Nr. E50001-U113-A230/5.

Ohlen, C., "New Intelligent Line Terminals," ABB Review, ABB, CH, Nr. 7/8, 1992, seiten 9-18.

* cited by examiner

ARRANGEMENT FOR CONTROLLING AND MONITORING A SWITCHGEAR ASSEMBLY

CLAIM FOR PRIORITY

This application is a national stage of PCT/DE2003/003104, published in the German language on Apr. 8, 2004, which claims priority to German Application No. 102 44 845.0 filed Sep. 20, 2002.

TECHNICAL FIELD OF THE INVENTION

The invention relates to an arrangement for controlling and monitoring a switchgear assembly.

BACKGROUND OF THE INVENTION

Siemens document "SICAM HV-Digitale Leistungsschaltersteuerung" (Digital Breaker Control DBC), Order No. E5001_U113-A230/1 has disclosed an arrangement for controlling and monitoring a switchgear assembly, of which one of a plurality of switch panels is illustrated. On an uppermost hierarchical plane, the arrangement has a local control system which is formed by a station control computation device. Via a so-called field bus, there is a communications link between the station control computation device and a process control device and a protective device; the two latter devices form a central plane in the hierarchy. The two devices need to satisfy the environmental conditions in the switchgear assembly and also conditions for EMC (electromagnetic compatibility). The known arrangement also has a dedicated process bus for the switch panel shown, and, via this process bus, the process control device is linked to apparatuses for digitally controlling switches, the switches being isolating/grounding switches and a power breaker. In addition, the process control device is linked, via the process bus, to transformer electronics having digital outputs, which are usually arranged outside in the switch panel in the vicinity of the switches. The protective device in the known arrangement is connected on the input side directly to the transformer electronics and is linked on the output side to the apparatus for digitally controlling the power breaker.

SUMMARY OF THE INVENTION

The invention discloses an arrangement for controlling and monitoring a switchgear assembly which can be produced with relatively little complexity.

In one embodiment of the invention, there is an arrangement for controlling and monitoring a switchgear assembly having a station control computation device, in which the functions of at least one process control device and/or at least one protective device are integrated, and having apparatuses for digitally controlling switches of the switchgear assembly having digital inputs and outputs; in addition the arrangement has transformer electronics, arranged in the vicinity of the switches, having digital outputs, the digital inputs and outputs of the apparatuses for digital control and the digital outputs of the transformer electronics being logically linked to the station control computation device via arbitrary physical communications links.

One significant advantage of the arrangement according to the invention is the fact that it manages without a process control device and without a protective device, since the functions of these devices are transferred to the station control computation device. Hence, no special outlay on these devices which is essentially determined by the fulfillment of the requirements as regards the environmental and EMC conditions. A further, significant advantage consists in the fact that a hierarchical plane, namely that formed by the process control and protective device, is dispensed with, as a result of which a saving of one bus can be achieved. One additional advantage is provided by the fact that, for the station control computation device, a conventional computer may also be used for handling the functions of the process control device and the protective device, and thus specially protected computation modules, as had to be used in previous arrangements for the process control and protective devices, are no longer required.

In another embodiment according to the invention, the station control computation device can be formed in different ways. For example, the station control computation device for each switch panel of the switchgear assembly can in each case have one station control computer, in which the functions of the process control and protective devices, which are associated with the respective switch panel, are integrated. In this embodiment, computers may be used which have a relatively low performance.

If a conventional computer having a relatively high computational power is available, it is advantageous if the station control computation device has, for at least two switch panels of the switchgear assembly, a common station control computation apparatus, in which the functions of the process control and protective devices, which are associated with the at least two switch panels, are integrated. This makes it possible to further reduce the overall complexity of the arrangement according to the invention.

In still another embodiment according to the invention may, in a simple and cost-optimum manner, be of redundant design by the apparatuses for digital control and the transformer electronics being logically linked to a further station control computation device via further arbitrary physical communications links.

BRIEF DESCRIPTION OF THE DRAWINGS

The invention is described below in more detail with reference to the drawings and exemplary embodiments, in which.

DETAILED DESCRIPTION OF THE INVENTION

Figure 1:
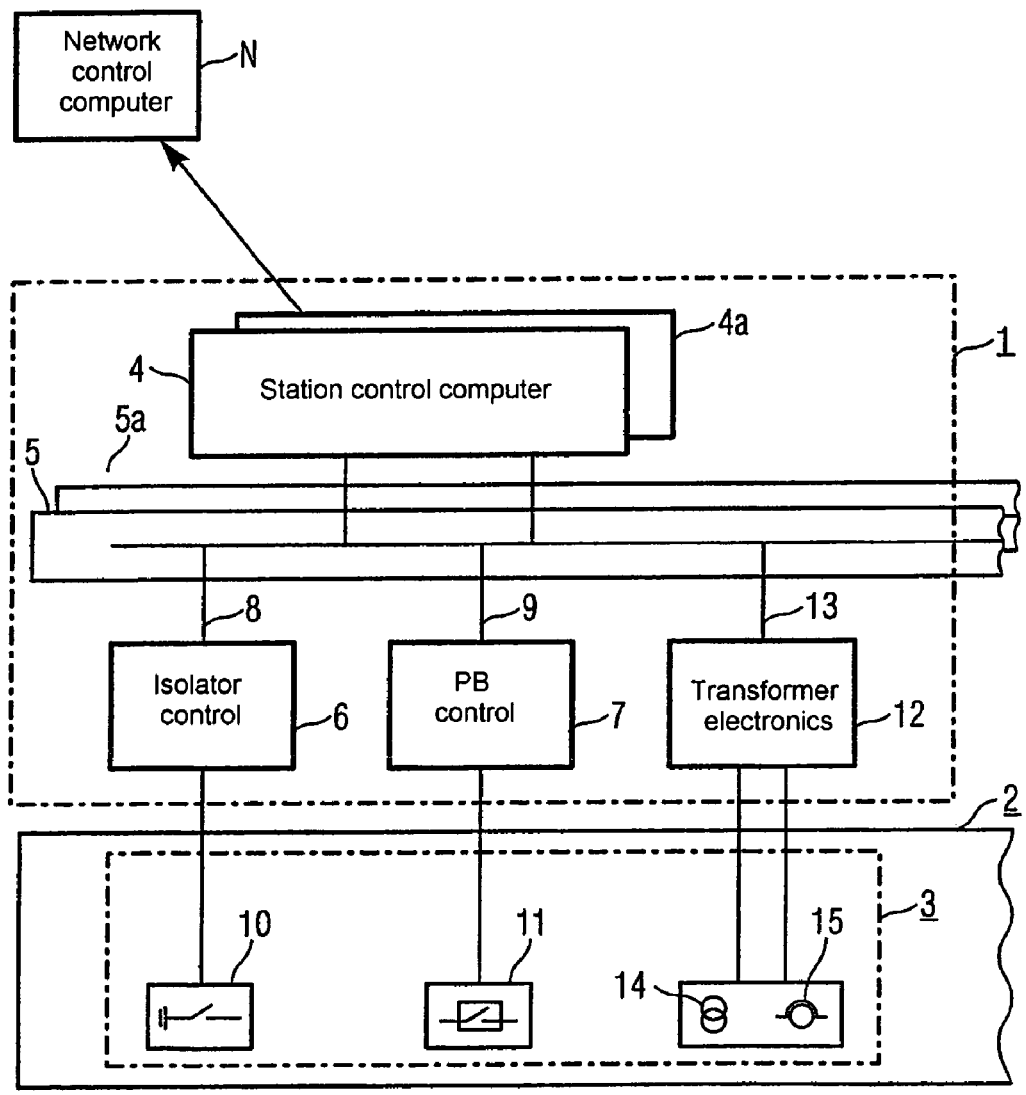
FIG. 1 shows a station control computation device, formed by a station control computer, for a switchgear assembly having a plurality of switch panels.

The arrangement 1 shown in FIG. 1 for controlling and monitoring a switchgear assembly 2, of which only one switch panel 3 is shown in the figure, has, as the station control computation device, a station control computer 4, which may be a conventional computer, for example a PC. The station control computer 4 is, on the one hand, linked in a conventional manner to a network control computer N, and, on the other hand, is connected to a bus 5 as the physical communications link. Apparatuses 6 and 7 for digital control having digital inputs and outputs 8 and 9 are linked to this bus 5; here, the apparatus 6 is an apparatus for digitally controlling an isolating switch 10 in the switch panel 3, and the apparatus 7 is an apparatus for digitally controlling a power breaker 11. In addition, transformer electronics 12 are connected with their digital output 13 to the bus 5. The transformer electronics 12 have a voltage transformer 14 and a current transformer 15 applied to them on the input side.

Further switch panels (not illustrated in the figure) of the switchgear assembly 2 are linked to the apparatuses 6 and 7, and transformer electronics, corresponding to the transformer electronics 12, are linked to the bus 5.

In order to increase the functional reliability of the arrangement shown in the figure, the bus 5 and also the station control computer 4 may be of redundant design by a second bus 5a being installed in parallel with the bus 5, and a second station control computer 4a, which is set up correspondingly, being installed in parallel with the station control computer 4.

What is claimed is:

1. An arrangement for controlling and monitoring a switchgear assembly, comprising:
    a station control computation device, in which the functions of a local control system and at least one process control device and at least one protective device are integrated with a result that no dedicated process control device and no dedicated protection device are present in the arrangement for controlling and monitoring the switchgear assembly;
    apparatus for digitally controlling switches of the switchgear assembly having digital inputs and outputs; and
    transformer electronics, arranged in a vicinity of the switches, having digital outputs, the digital inputs and outputs of the apparatuses for digitally controlling and the digital outputs of the transformer electronics being logically linked the station control computation device via arbitrary physical communication links using one communication bus.

2. The arrangement as claimed in claim 1, wherein
    the station control computation device for each switch panel of the switchgear assembly in each case has one station control computation apparatus, in which the functions of the process control and protective devices, which are associated with the respective switch panel, are integrated.

3. The arrangement as claimed in claim 1, wherein
    the station control computation device has, for at least two switch panels of the switchgear assembly, a common station control computer, in which the functions of the process control and protective devices, which are associated with the at least two switch panels are integrated.

4. The arrangement as claimed in claim 1, wherein
    the apparatuses for digitally controlling and the transformer electronics are directly linked to a further station control computer via further arbitrary physical communications links.

5. The arrangement as claimed in claim 1, wherein
    the station control computation device, in which the functions of the local control system and at least one process control device and at least one protective device are integrated, is a personal computer.

* * * * *